United States Patent
Jiang et al.

(10) Patent No.: US 11,652,536 B2
(45) Date of Patent: May 16, 2023

(54) RESOURCE RESERVATIONS FOR RELAY NODES

(71) Applicant: ZTE Corporation, Guangdong (CN)

(72) Inventors: Chuangxin Jiang, Guangdong (CN); Feng Bi, Guangdong (CN); Chenchen Zhang, Guangdong (CN); Shujuan Zhang, Guangdong (CN); Lin Chen, Guangdong (CN); Zhaohua Lu, Guangdong (CN)

(73) Assignee: ZTE Corporation, Guangdong (CN)

( * ) Notice: Subject to any disclaimer, the term of this patent is extended or adjusted under 35 U.S.C. 154(b) by 186 days.

(21) Appl. No.: 17/148,355

(22) Filed: Jan. 13, 2021

(65) Prior Publication Data

US 2021/0135743 A1 May 6, 2021

Related U.S. Application Data

(63) Continuation of application No. PCT/CN2018/095633, filed on Jul. 13, 2018.

(51) Int. Cl.
*H04B 7/155* (2006.01)
*H04W 72/0453* (2023.01)

(52) U.S. Cl.
CPC ..... *H04B 7/15542* (2013.01); *H04B 7/15507* (2013.01); *H04W 72/0453* (2013.01)

(58) Field of Classification Search
CPC ........... H04B 7/15542; H04B 7/15507; H04W 72/0453; H04W 72/044
See application file for complete search history.

(56) References Cited

U.S. PATENT DOCUMENTS 6,459,881 B1 * 10/2002 Hoder ................ H04B 7/15542
455/13.1
7,480,485 B1 * 1/2009 Oh ...................... H04B 7/15542
455/7

(Continued)

FOREIGN PATENT DOCUMENTS

CN 103636158 A 3/2014
JP 2011004096 A 1/2011

(Continued)

OTHER PUBLICATIONS

International Search Report and Written Opinion, PCT/CN2018/095633 dated Mar. 25, 2019, 13 pages.

(Continued)

*Primary Examiner* — Dominic E Rego
(74) *Attorney, Agent, or Firm* — Perkins Coie LLP (57) ABSTRACT

Methods, systems and devices for resource reservations for relay nodes in 5G and New Radio (NR) networks are described. An exemplary method for wireless communication includes performing a first set of communications between a first relay node and at least one parent of the first relay node using transmission resources that are determined by at least a first type of resources, and performing a second set of communications between the first relay node and at least one child node of the first relay node using transmission resources that are determined by at least a second type of resources. Another exemplary method for wireless communication includes receiving a slot format message from a parent of the first relay node, where the slot format message is effective in a time offset, which is based on a hop index of the first relay node.

21 Claims, 9 Drawing Sheets

(56) References Cited

U.S. PATENT DOCUMENTS

| | | | |
|---|---|---|---|
| 8,634,842 B2* | 1/2014 | Zhang | H04W 72/04 |
| | | | 370/328 |
| 9,578,539 B1* | 2/2017 | Park | H04W 52/267 |
| 10,021,691 B1* | 7/2018 | Marupaduga | H04L 5/0007 |
| 10,292,171 B2* | 5/2019 | Kobayashi | H04W 72/082 |
| 10,568,082 B2* | 2/2020 | Nammi | H04L 5/0092 |
| 10,868,649 B2* | 12/2020 | Chou | H04L 5/0098 |
| 2012/0063369 A1* | 3/2012 | Lin | H04B 7/15542 |
| | | | 370/279 |
| 2013/0077542 A1* | 3/2013 | Yang | H04B 7/15542 |
| | | | 370/280 |
| 2017/0111952 A1* | 4/2017 | Choi | H04L 5/0048 |
| 2018/0042031 A1 | 2/2018 | Hampel et al. | |
| 2018/0192384 A1* | 7/2018 | Chou | H04W 24/10 |
| 2018/0323928 A1* | 11/2018 | Yang | H04L 5/0044 |
| 2019/0075589 A1* | 3/2019 | Jeon | H04L 1/1819 |
| 2019/0082355 A1* | 3/2019 | Ryoo | H04W 24/08 |
| 2019/0116605 A1* | 4/2019 | Luo | H04B 7/15542 |
| 2019/0191399 A1* | 6/2019 | Islam | H04W 56/009 |
| 2019/0215868 A1* | 7/2019 | Ye | H04L 69/28 |
| 2019/0289513 A1* | 9/2019 | Jeon | H04L 5/0098 |
| 2019/0306848 A1* | 10/2019 | Zhou | H04W 72/044 |
| 2019/0312635 A1* | 10/2019 | Ang | H04L 5/001 |
| 2019/0327785 A1* | 10/2019 | Li | H04W 52/0219 |
| 2019/0342907 A1* | 11/2019 | Huang | H04L 5/0048 |
| 2020/0145970 A1* | 5/2020 | Nammi | H04L 5/0023 |
| 2022/0294595 A1* | 9/2022 | Jeon | H04L 5/0098 |

FOREIGN PATENT DOCUMENTS

| | | |
|---|---|---|
| KR | 20070098169 A | 10/2007 |
| TW | 201807971 A | 3/2018 |

OTHER PUBLICATIONS

Co-Pending CN Application No. 2018800955841, CN office action dated Aug. 1, 2022, 14 pages with unofficial translation.

Vivo "Enhancements to support NR backhaul link" 3GPP TSG RAN WG1 Meeting #93, R1-1806089, Busan, Korea, May 21-25, 2018 3 pages.

ZTE "Discussion on IAB node resource allocation" 3GPP TSG-RAN WG2 NR AdHoc 1807 Montreal, Canada, Jul. 2-6, 2018, R2-1810215, 4 pages.

Co-Pending CN Application No. 2018800955841, CN second office action dated Jan. 30, 2023, 13 pages with unofficial translation.

* cited by examiner

| backhaul link | DL | unknown | UL |
|---|---|---|---|
| access link | UL | unknown | DL |

Receiving a slot format message, which is effective in a time offset that is based on a hop index of a first relay node, from a parent of the first relay node ⎯ 1610

RESOURCE RESERVATIONS FOR RELAY NODES

CROSS REFERENCE TO RELATED APPLICATIONS

This patent document is a continuation of and claims benefit of priority to International Patent Application No. PCT/CN2018/095633, filed on Jul. 13, 2018. The entire content of the before-mentioned patent application is incorporated by reference as part of the disclosure of this application.

TECHNICAL FIELD

This document is directed generally to wireless communications.

BACKGROUND

Wireless communication technologies are moving the world toward an increasingly connected and networked society. The rapid growth of wireless communications and advances in technology has led to greater demand for capacity and connectivity. Other aspects, such as energy consumption, device cost, spectral efficiency, and latency are also important to meeting the needs of various communication scenarios. In comparison with the existing wireless networks, next generation systems and wireless communication techniques need to provide support for an increased number of users and devices, thereby requiring reliable and efficient relayed communications.

SUMMARY

This document relates to methods, systems, and devices for resource reservations for relay nodes in 5G and New Radio (NR) networks. The disclosed technology describes methods for configuring multiple types of reserved resources, which may be selectively used for data communication between relay nodes, their parent nodes and their child nodes.

In one exemplary aspect, a wireless communication method is disclosed. The method includes performing a first set of communications between a first relay node and at least one parent of the first relay node using transmission resources that are determined by at least a first type of resources, and performing a second set of communications between the first relay node and at least one child node of the first relay node using transmission resources that are determined by at least a second type of resources.

In another exemplary aspect, a wireless communication method is disclosed. The method includes performing a first set of communications between at least one parent of a first relay node and at least one child of the first relay node using transmission resources that are determined by at least a first type of resources, and performing a second set of communications between the at least one parent of the first relay node and a user equipment using transmission resources that are determined by at least a second type of resources.

In yet another exemplary aspect, a wireless communication method is disclosed. The method includes receiving a slot format message from a parent of the first relay node, where the slot format message is effective in a time offset, and where the time offset is based on a hop index of the first relay node.

In yet another exemplary aspect, the above-described methods are embodied in the form of processor-executable code and stored in a computer-readable program medium.

In yet another exemplary embodiment, a device that is configured or operable to perform the above-described methods is disclosed.

The above and other aspects and their implementations are described in greater detail in the drawings, the descriptions, and the claims.

DETAILED DESCRIPTION

Current and future cellular systems are being characterized by significantly increased network user density, and it has become exceedingly difficult to provide traditional fiber backhaul access to each cell site. Furthermore, the increasing maturity of millimeter wave (mmWave) communication has opened up the possibility of providing high-speed wireless backhaul to such cell sites. Since mmWave is also suitable for access links, the third generation partnership project (3GPP) is envisioning an integrated access and backhaul (IAB) architecture for the fifth generation (5G) cellular networks in which the same infrastructure and spectral resources will be used for both access and backhaul.

Figure 1:
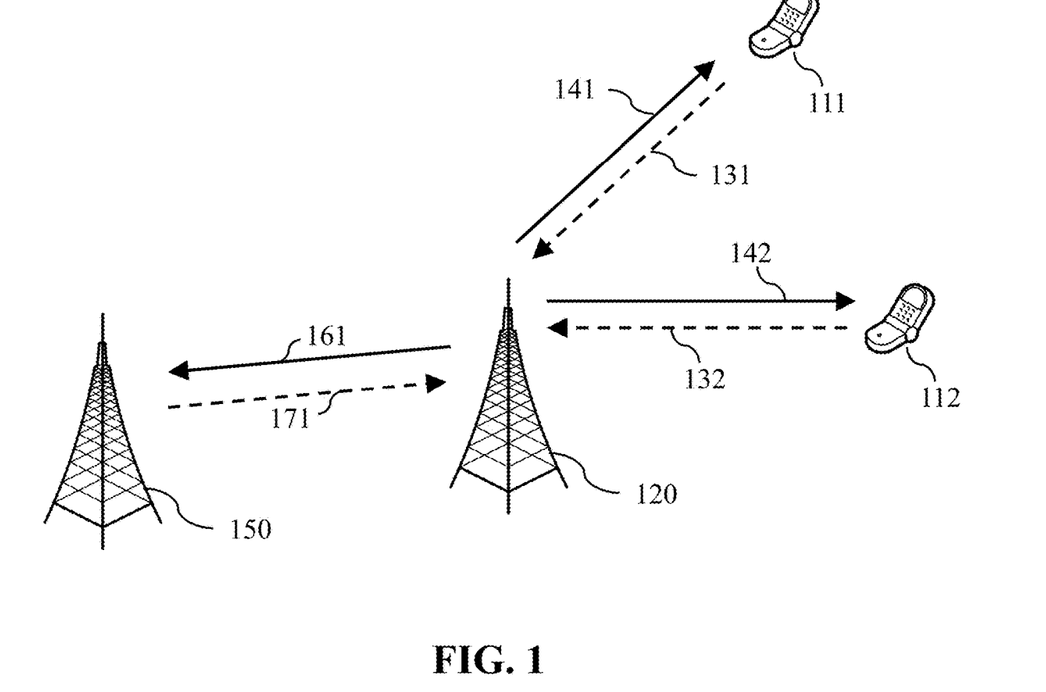
FIG. 1 shows an example of a base station (BS) and user equipment (UE) in wireless communication, in accordance with some embodiments of the presently disclosed technology.

FIG. 1 shows an example of a wireless communication system (e.g., a 5G or NR (New Radio) cellular network) that includes a BS 150, an IAB relay node 120 and one or more user equipment (UE) 111 and 112. In some embodiments, the UEs (111, 112) may communicate with the IAB node (120) over a set of resources (131, 132, 141, 142) that exclude a first type of resource, and the IAB node (120) may communicate with the BS (150) over another set of resources (161, 171) that exclude a second type of resource. The UE may be, for example, a smartphone, a tablet, a mobile computer, a machine to machine (M2M) device, an Internet of Things (IoT) device, and so on. Section headings are used in the present document to improve readability of the description and do not in any way limit the discussion or the embodiments (and/or implementations) to the respective sections only.

1. Introduction to Multi-Hop Networks with IAB Nodes

As discussed, IAB (Integrated Access and Backhaul for NR) is an important direction in 3GPP NR (New Radio). In the case of insufficient base station coverage, some relay nodes or IAB nodes are introduced to relay signal propagation between the base station and the UE. Since the distance between the introduced IAB node and the base station or the UE is closer than the distance between the base station and the UE, the coverage of the relay signal is much better than that of the signal directly from the base station to the UE, thereby improving the transmission efficiency and effectively increasing the number of cells.

Figure 2:
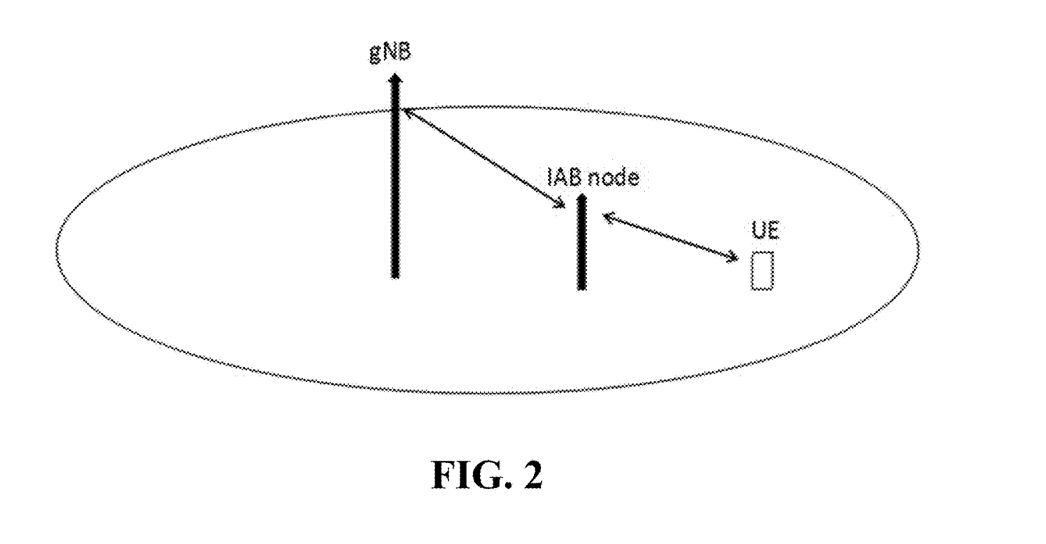
FIG. 2 shows an example of an IAB (Integrated Access and Backhaul for NR) node network diagram.

As shown in FIG. 2, since the distance between the base station and the UE is too long and the path loss is too large, the signal sent by the base station may not be received by the UE. After the introduction of the IAB node, for the downlink, the base station may first send the signal to the IAB node, and then the IAB node forwards the signal to the UE through the radio air interface. For the uplink, the UE may first send the signal to the IAB node, and then the IAB node forwards the signal to the base station through the radio air interface.

If the path loss in the network environment is too large, multiple IAB nodes can be introduced between the base station and the UE to signal.

Figure 3:
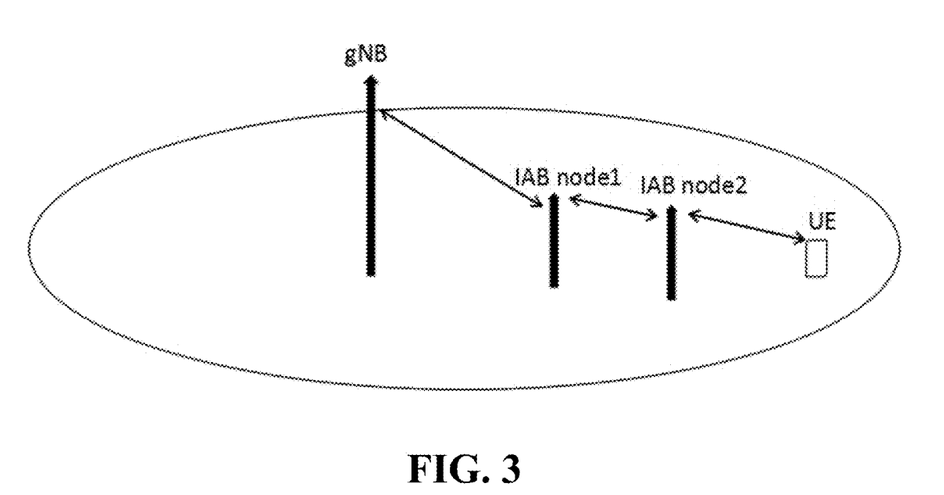
FIG. 3 shows an example of a multi-IAB node network diagram.

As shown in FIG. 3, for the downlink, the base station first transmits the data to the IAB node 1, and then the IAB node 1 is forwarded to the IAB node 2 and finally forwarded by the IAB node 2 to the UE. This kind of multiple transfer method is called multiple hop, and the transition (or hop) index (or number) is called the hop order. For example, the hop order from the base station to the IAB node 1 is 0, and the hop order from the IAB node 1 to the IAB node 2 is 1, from the IAB node 2 to the UE, the hop order is 2.

The transmission from the base station to the current IAB, or from an IAB node to the current IAB node is called the backhaul link. The signal transmission from the current IAB node to the UE or an IAB node is called the access link. For an IAB node, the previous node (possibly base station or IAB node) that controls it is called the parent (donor or parent), and the next node that it controls (possibly an IAB node or UE) is called a child (child).

Figure 4:
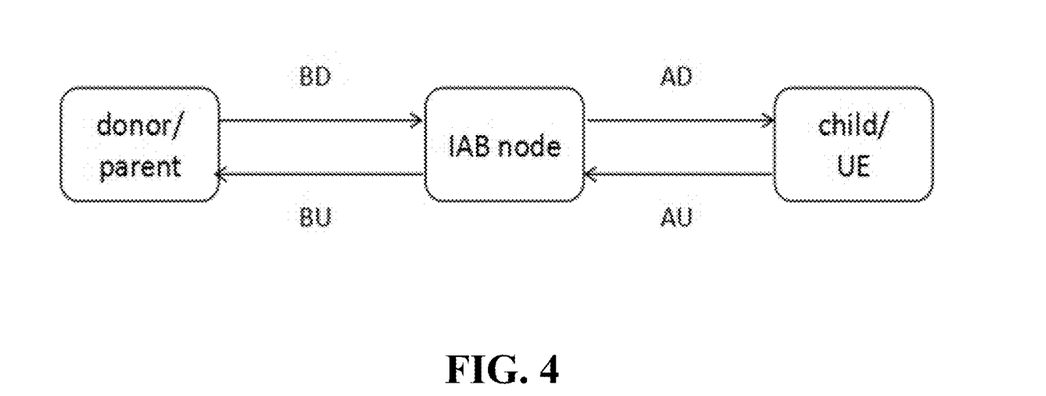
FIG. 4 shows an example of uplink and downlink schematics of backhaul links and access links.

FIG. 4 shows an example of uplink and downlink schematics of backhaul links and access links. As shown in FIG. 4, the link from the parent node to the IAB node is the backhaul link; the transmission link that the parent node sends and the link received by the IAB node is the backhaul downlink (BD: backhaul downlink), and the link that the IAB node sends to the parent is the backhaul uplink (BU: backhaul uplink). The link between the IAB node and the child node is the access link. The link sent by the IAB node and received by the child node is the access downlink (AD). The link that child node sends to the IAB node is the access uplink (AU).

Due to the limitation of the half duplex, the IAB node cannot generally receive and transmit signals at the same time, that is, the BD and AD links cannot be performed at the same time, and the BU and AU cannot perform simultaneously. If the mutual interference is weak, the IAB node can perform BD and AU reception or send BU and AD at the same time.

Embodiments of the disclosed technology enable the IAB node better decide whether the reserved resources can be used for data transmission between an IAB node and its child nodes. The parent node is configured to the IAB node with at least two types of reserved resources, Type 1 reserved resources that cannot be used for the transmission of this IAB node and its parent node, and Type 2 reserved resources that cannot be used for transmission of this IAB node and its child nodes. At the same time, the parent node of the IAB node informs the IAB node of a time interval between the DCI (downlink control information) carried SFI (slot format indicator) and the SFI effective time, where the time interval is determined by hop order.

2. Exemplary Embodiments with Multiple Reserved Resources

In some embodiments, when the base station sends downlink data to the UE, there are often some resources reserved for data transmission. That is, when the UE receives the PDSCH, the reserved resources are not used for the PDSCH. These reserved resources can be RB level, time domain symbol level, or RE level. Similar to the current NR mechanism, these reserved resources can be RB symbol level granularity or RE level granularity, which is described in the current 38.214 protocol. These reserved resources are used for a wide range of purposes, such as to use reserved resources for LTE users, for users of NRs, for emergency services of other users, or to avoid inter-cell communication, strong interference, etc.

Similarly, for the backhaul link, e.g., the transmission from the base station/parent node to the IAB node, the base station/parent node can configure reserved resources for the IAB node, and these resources are not used for the backhaul link. There are two options as to whether the IAB node can use these reserved resources for access link data scheduling:

Option 1: IAB node cannot use these reserved resources, or

Option 2: IAB node can use these reserved resources.

For Option 1, this leads to a waste of resources. If this IAB node adds some reserved resources for other purposes, the reserved resources associated with the notification from the base station/parent node cannot be used for data scheduling of the access link. This wastes a lot of resources since some reserved resources may not introduce serous interference to the access link and can still be used for access link transmission. Especially for multiple hop transmissions, the reserved resources will accumulate more.

For Option 2, if the IAB node uses these reserved resources for access link data transmission without any auxiliary information, it may have a great influence on the signals on these reserved resources. For example, resources originally reserved by the base station/parent node are used to transmit emergency-critical services to one UE. If the IAB node schedules access link data on the reserved resources, the reserved resources may be affected and the transmission of emergency-critical services may not be achieved correctly.

To enable the IAB node better decide whether the reserved resource can be used for data transmission between the IAB node and its child nodes, a method for configuring multiple reserved resource types include the parent node being configured to the IAB node with at least two types of reserved resources:

Type 1: Reserved resources cannot be used for the transmission of this IAB node and its parent node, and Type 2: Reserved resources cannot be used for transmission of this IAB node and its child nodes.

Figure 5:
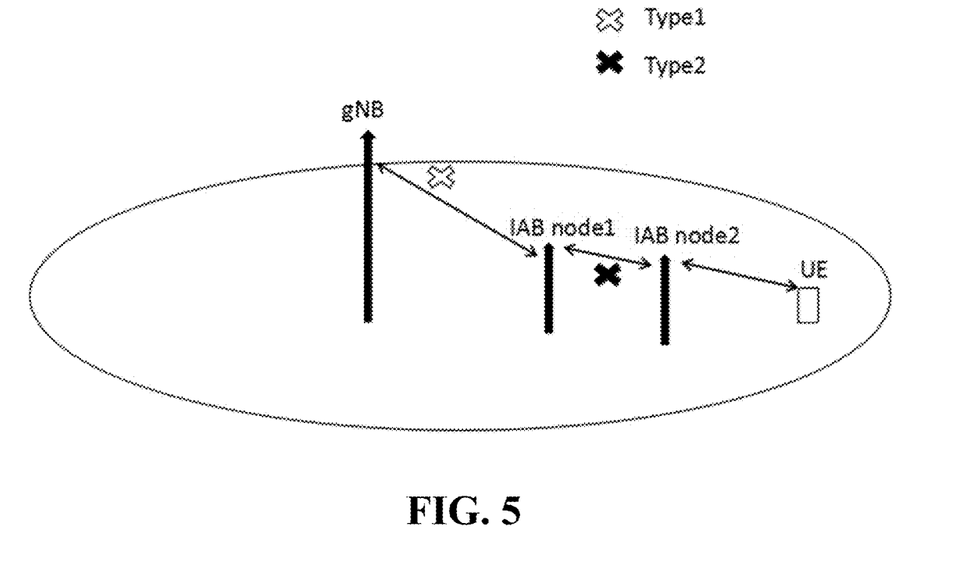
FIG. 5 shows an example of two types of reserved resources for IAB nodes.

As shown in FIG. 5, for IAB node 1, its parent node is the base station, and the base station is configured to the IAB node 1 with two types of reserved resources, wherein Type 2 reserved resources cannot be used for the transmission of IAB node 1 to IAB node 2. In other words, Type 2 reserved resources cannot be used for the IAB node transmission to its child nodes. In the example shown in FIG. 5, for the IAB node 1, its parent node is a base station, and the base station is configured to the IAB node 1 with two types of reserved resources. The reserved resources of type 2 cannot be used for the transmission of IAB node 1 to IAB node 2, and whether it can be used for the transmission of IAB node 2 to the UE requires further instructions. In other words, the reserved resources of Type 2 cannot be used for the transmission from the IAB node 1 to the IAB node 2, and whether it can be used for the transmission of the IAB node 2 to the UE requires further instructions.

In some embodiments, type 2 reserved resources cannot be used for transmission between the parent of the IAB node and the IAB node either. For example, the reserved resources of Type 2 cannot be used for the transmission from the base station to the IAB node 1 to the IAB node 2, and whether it can be used for the transmission of the IAB node 2 to the UE requires further instructions.

In some embodiments, the general type 2 reserved resources also cannot be used for IAB node and its parent node transmission, so the type 2 reserved resources are a subset of type 1 (can be equal to type 1 reserved resources). This is because the reserved resources of type 2 are assumed to be unavailable from any base station to any intermediate links in the UE. Therefore, there is a further restriction on the reserved resources of type 2 that the reserved resources of type 2 cannot be used for transmission of all intermediate links from the IAB node to the UE.

As shown in FIG. 5, for IAB node 1, its parent node is a base station, and the base station is configured to reserve two types of reserved resources for IAB node 1, and type 2 reserved resources cannot be used for IAB node 1 to IAB node 2 transmissions and for IAB node 2 to UE transmissions. Alternatively, the reserved resources of type 2 can be interpreted as the transmission of all intermediate links of the parent node from the IAB node to the UE that cannot be used, and at this time, the reserved resources of the type 2 do not need to overlap with the reserved resources of the type 1, or the resource that does not need type 2 is a subset of type 1, because the transmission resources of the IAB and its parent nodes cannot be mapped to reserved resources of type 1 nor can they be mapped to reserved resources of type 2.

In some embodiments, and if it is assumed that the reserved resources of type 2 cannot indicate whether the IAB node 2 to the UE are used, in order to make some reserved resources not used by any transit links, type 3 reserved resources may be introduced: the reserved resources cannot be used for the transmission of all transit links from the IAB node to its child nodes to the UE. At this point, the reserved resource of type 3 may be required to be a subset of reserved resources of type 2. This is because part of the resources of Type 2 may still be used for the transmission of the child nodes of the IAB node to the child nodes of the child node. Or, the reserved resource of type 3 is that any link from the parent node of the IAB node to the UE cannot be used.

The following examples further elucidate various aspects of resource reservations for IAB nodes according to the disclosed technology. The examples of the disclosed technology provided below explain general concepts, and are not meant to be interpreted as limiting. In an example, unless explicitly indicated to the contrary, the various features described in these examples may be combined.

Example 1. Two types of reserved resources, in which Type 1 resources cannot be used for the transmission of the IAB node and its parent node, and Type 2 resources cannot be used for the transmission of the IAB node and its children.

As shown in FIG. 5, the parent node (base station) of IAB node 1 configures the IAB node 1 two types of reserved resources, and type 2 resources cannot be used for the transmission of IAB node 1 and its child nodes (IAB node 2).

In some embodiments, it is possible to restrict the type 2 resource to be a subset of the type 1 resource.

In some embodiments, and if there is no other signaling, except for the reserved resource type 2, the IAB node can assume that the rest of the resources can be used for the transmission between the IAB node 1 and the IAB node 2.

Example 1a. Two types of reserved resources, in which Type 1 resources cannot be used for transmissions of this IAB node and its parent, and Type 2 resources cannot be used for transmissions from the parent node of this IAB node to its child nodes.

Figure 6:
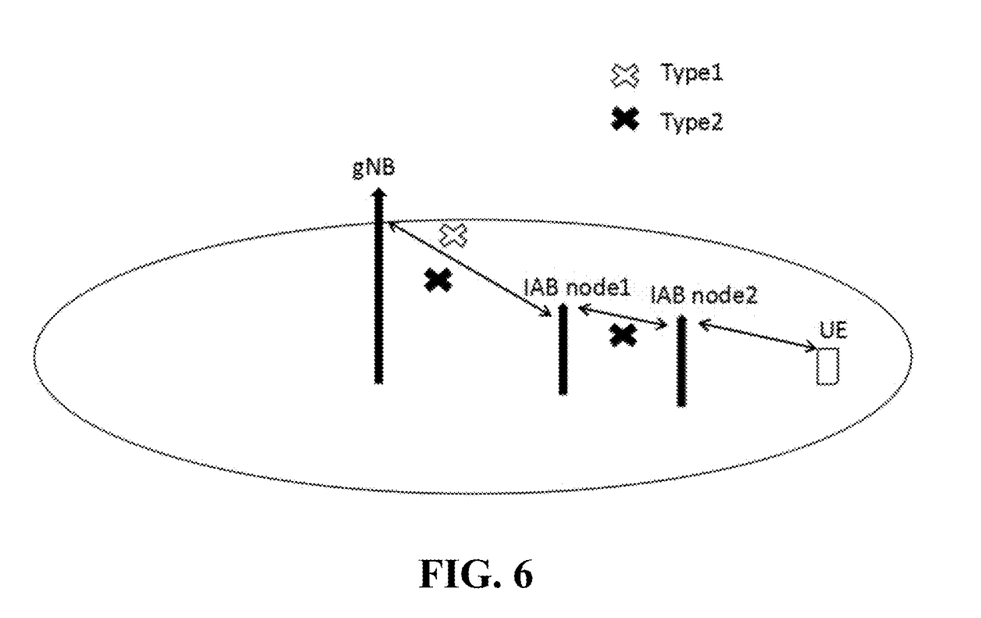
FIG. 6 shows another example of two types of reserved resources for IAB nodes.

As shown in FIG. 6, reserved resources of type 2 cannot be used for transmission from the base station to IAB node 2.

In some embodiments, and if there is no other signaling, in addition to the reserved resource type 2, the IAB node 1 can assume that the remaining resources can be used for the transmission between the IAB node 1 and the IAB node 2.

Example 1b. Two types of reserved resources, in which Type 1 resources cannot be used for transmissions of this IAB node and its parent, and Type 2 resources cannot be used for transmission from the parent node to the UE. In other words, Type 2 reserved resources cannot be used for transmission of the entire link.

Figure 7:
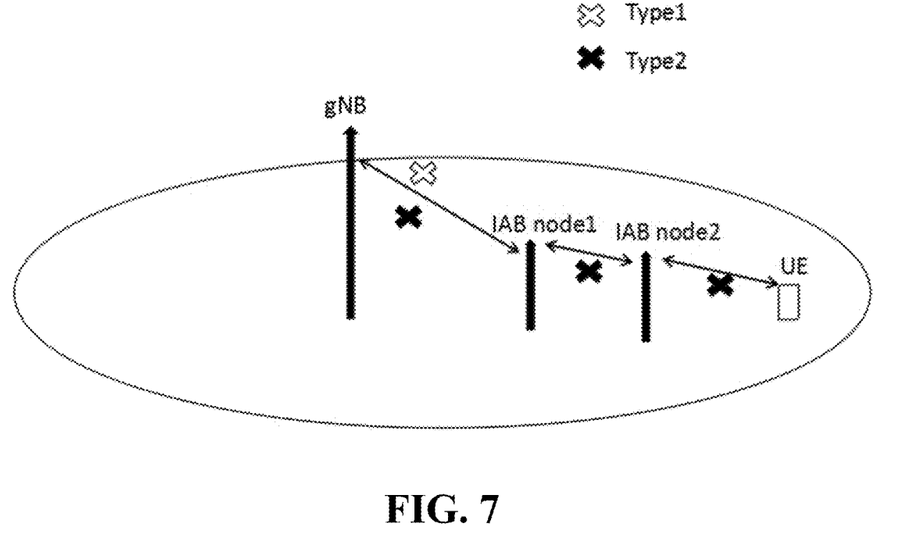
FIG. 7 shows yet another example of two types of reserved resources for IAB nodes.

As shown in FIG. 7, reserved resources of type 2 cannot be used for transmission from the base station to the UE.

In some embodiments, and if there is no other signaling, in addition to the reserved resource type 2, the IAB node can assume that the remaining resources can be used for transmission between the IAB node 1 and the IAB node 2.

Example 1c. Two types of reserved resources, in which Type 1 resources cannot be used for transmissions of this IAB node and its parent, and Type 2 resources cannot be used for transmission of any link between the IAB node and the UE.

Figure 8:
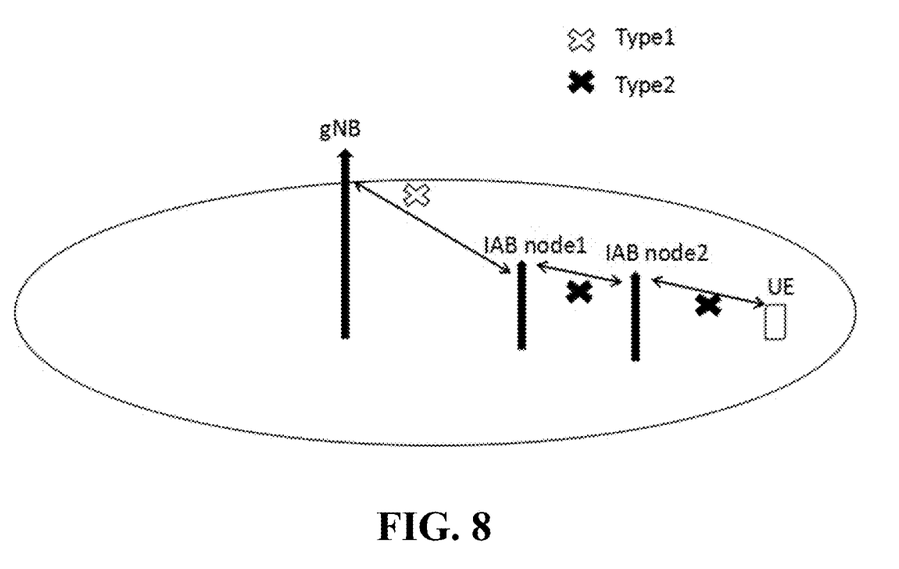
FIG. 8 shows yet another example of two types of reserved resources for IAB nodes.

As shown in FIG. 8, reserved resources of type 2 cannot be used for the transmission between IAB node 1 and the UE.

In some embodiments, it is possible to restrict the type 2 resource to be a subset of the type 1 resource.

In some embodiments, and if there is no other signaling, in addition to the reserved resource type 2, the IAB node can assume that the remaining resources can be used for transmission between the IAB node 1 and the IAB node 2.

Example 2. Three types of reserved resource, in which Type 1 resources cannot be used for transmissions of this IAB node and its parent, Type 2 resources cannot be used for the transmission of the IAB node and its children, and Type 3 resources cannot be used for any transmission between the IAB node to the UE.

Figure 9:
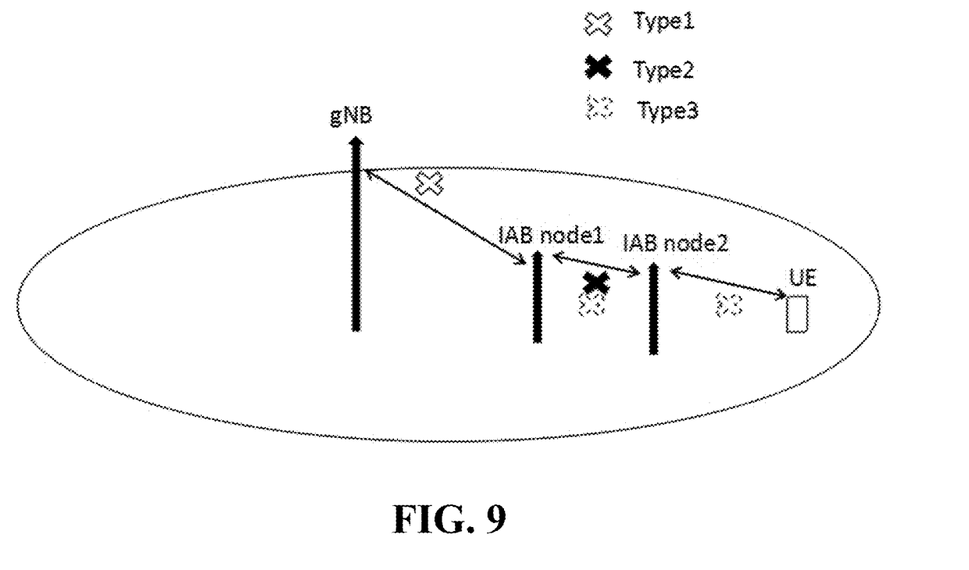
FIG. 9 shows an example of three types of reserved resources for IAB nodes.

As shown in FIG. 9, the parent node (base station) of IAB node 1 is configured to two types of reserved resources for IAB node 1, and type 2 resources cannot be used for the transmission of IAB node 1 and its child nodes (IAB node 2).

Type 1 and Type 2 are the same as described in Example 1.

As shown in FIG. 9, Type 3 resources cannot be used for IAB node 1 to UE transmission.

Example 2a. Three types of reserved resources, in which Type 1 resources cannot be used for transmissions of this IAB node and its parent, Type 2 resources cannot be used for the transmission of the IAB node and its children, and Type 3 resources cannot be used for any transmission from the parent node of the IAB node to the UE.

Figure 10:
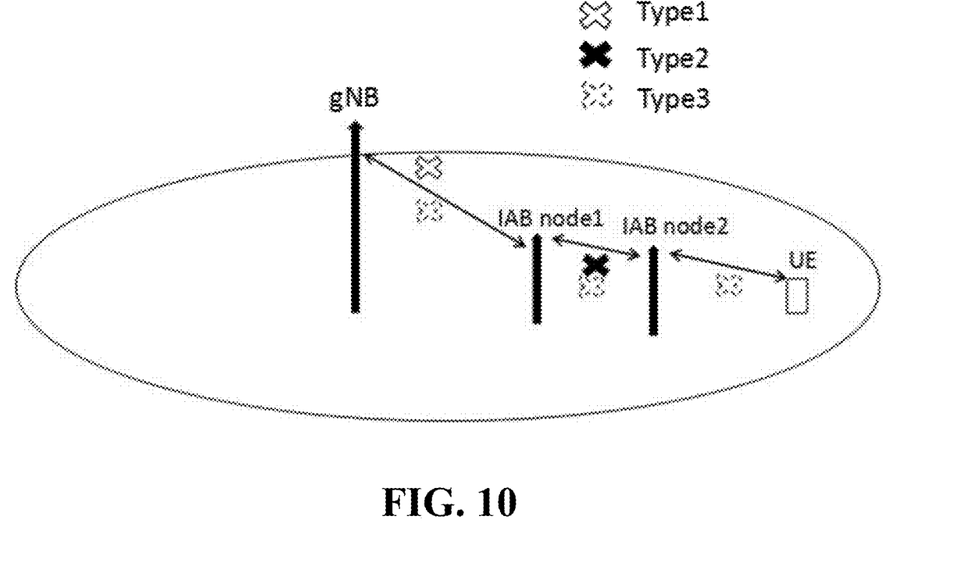
FIG. 10 shows another example of three types of reserved resources for IAB nodes.

As shown in FIG. 10, the parent node (base station) of IAB node 1 is configured to two types of reserved resources of IAB node 1, and type 2 resources cannot be used for the transmission of IAB node 1 and its child nodes (IAB node 2).

As shown in FIG. 10, resource type 3 cannot be used for the transmission of any link between the base station and the UE.

Figure 11:
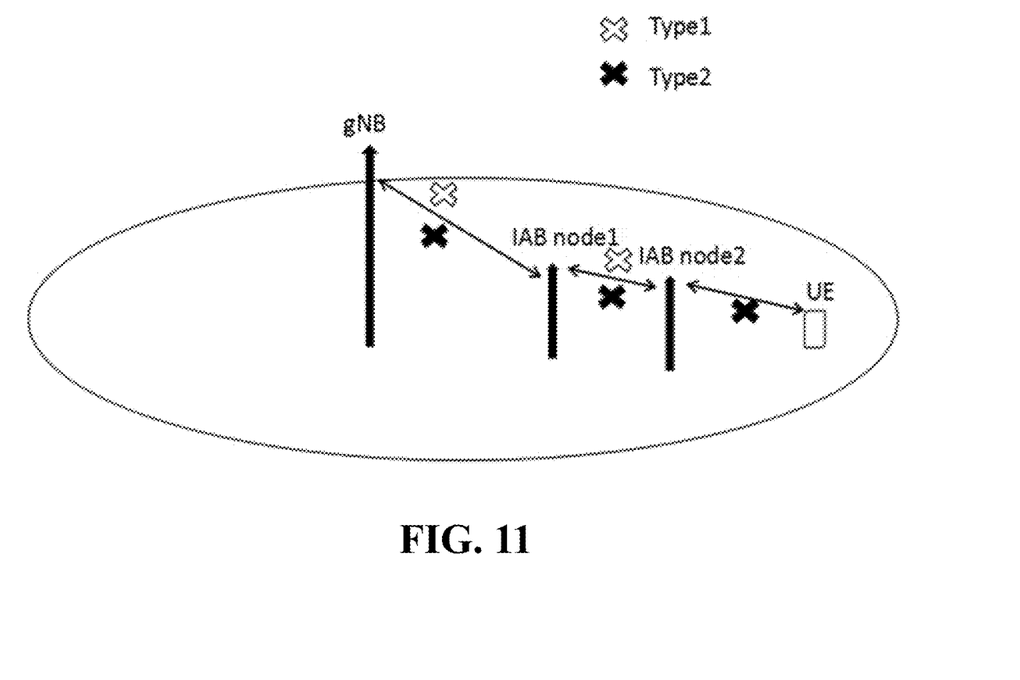
FIG. 11 shows yet another example of two types of reserved resources for IAB nodes.

FIG. 11 shows another case of two types of reserved resources, wherein:

Type 1: Reserved resources cannot be used for the transmission between the parent of the IAB node and the child of the IAB node, and Type 2: Reserved resources cannot be used for transmission of the entire links from the parent of this IAB node to UE, or cannot be used for transmission from the child of the IAB node to UE.

The above described reserved resources can be applied to both uplink and downlink, that is, the reserved resources can neither be used for downlink transmissions nor used for uplink data transmissions. Data refers to PDSCH or PUSCH, RS or PUCCH, PDCCH, etc.

However, as shown in FIG. 4, the IAB node cannot receive and send at the same time because of the limitation of half duplex. In some embodiments, the transmission of BD and AD or BU and AU cannot be performed at the same time. Therefore, when the reserved resources are configured, the one or more types of reserved resources may be further divided into two subtypes. For example, type 2 reserved resources are further divided into two subtypes, one for the downlink and one for the uplink. At this point, the two subtypes of reserved resources cannot be used by the two links of AD and AU respectively.

In some embodiments, and if some uplink PUCCH resources need to be reserved, and because the PUCCH resources are not regular rectangular video resources when the frequency hopping is enabled, the above type of reserved resource types 2 or 3 may contain the ID of the PUCCH resource or the resource set. When an IAB node configures an AD resource, it bypasses the configured PUCCH resources or the REs of the resource set.

3. Exemplary Embodiments with Multiple Frequency-Domain Resources

In some embodiments, and in order to avoid serious interference between the backhaul link resource and the access link resource, the backhaul link resource and the access link resource may be orthogonalized in the frequency domain. A method of coordinating backhaul link and access link resources includes the parent node of an IAB node notifies two frequency domain resource sets, where the first frequency domain resource set is used for transmission of the backhaul link (transmission of the parent node of the IAB node to the IAB node), and the second frequency domain resource set is used for transmission of the access link (transmission between the IAB node and the child of the IAB node).

In the example of a frequency-division duplexed (FDD) system, the configuration of frequency domain resources is configured separately for uplink and downlink, so the first frequency domain resource set and the second frequency domain resource set may each include two frequency domain resource subsets, one for the downlink and one for the uplink. The frequency domain resource refers to the resource length and location in the frequency domain, such as the number of physical resource blocks (PRBs) or sub-carriers. For example, in a bandwidth part (BWP), PRBs 0-49 are assigned to the backhaul link and PRBs 50-99 are assigned to the access link.

If the frequency domain resource is viewed as a BWP, then the parent node of the IAB node configures different BWPs for the backhaul link and the access link to achieve the purpose of orthogonal resources. In the current NR, a CC (component carrier) can contain multiple BWPs, one of the multiple configured BWPs (bandwidth part) may be a semi-static selection to the UE, or may be dynamically indicated to the UE through the DCI. For the sake of simplification, the resource transmission of the backhaul link can be used with the same BWP of the access link. In this way, frequency-division multiplexing (FDM) can be implemented, that is, the resources of the backhaul link can be orthogonalized to the resources of the access link, thereby reducing the interference.

In some embodiments, another method of coordinating backhaul link and access link resources for a CC is for the parent node of an IAB node to select two BWP sets (the first BWP set and the second BWP set), where the first BWP set is used for the transmission of the backhaul link (the transmission of the parent node of the IAB node to the IAB node), and the second BWP set is used for transmission of access link (transmission of IAB node to this IAB node sub-node). In order to achieve orthogonalization, the parent node of the IAB node can configure BWPs on different frequency domain segments to the backhaul and access links. Of course, in the actual scheduling, for the backhaul link, the parent node of the IAB node may only select one BWP from the configured BWP set for transmission within a period of time. For an access link, the IAB node may only select one BWP from the configured BWP set for transmission over a period of time. In addition, since the BWP configuration may be configured separately for uplink and downlink, the first BWP set and the second BWP set may each include 2 BWP subsets, one for the downlink and one for the uplink.

For example, the first BWP set configured by the parent node of the IAB node includes two sub-collections, and the sub-collection 1 in the first BWP set includes four BWPs (BWP0, BWP1, BWP2, and BWP3) for downlink of the backhaul link; the sub-collection 2 in the first BWP set contains 4 BWPs (BWP4, BWP5, BWP6, BWP7) for the uplink of the backhaul link; the sub-collection 1 in the second BWP set includes 4 BWPs (BWP0', BWP1', BWP2', BWP3') for downlink of the access link; and sub-collection 2 in the second BWP set contains 4 BWPs (BWP4', BWP5', BWP6', BWP7') for uplink of the access link.

Allocating all the resources of the backhaul link and the resources of the access link are allocated in different frequency domains will result in a very large waste of resources. Since generally only one of the configured multiple BWPs is used for physical layer signal transmission at a time, an exemplary method of coordinating backhaul link and access link resources is to establish correspondences between frequency domain resources in the two frequency domain resource sets: each frequency domain resource in the first frequency domain resource set corresponds to one or more frequency domain resources in the second frequency domain resource set.

For example, it is assumed the frequency domain resource are BWP, BWPi and BWPi' (with i=0, 1, 2, 3). When the parent node of the IAB node wants the backhaul link to use BWPi, the access link uses BWPi'. It is only necessary to ensure that the BWPi and BWPi' are allocated on different frequency domains without the need for the BWPi to be orthogonal to all BWPs in the second BWP set. If one BWP in the first BWP set can correspond to multiple BWPs in the second BWP sets, e.g., for a BWPi (potentially used for transmission from the parent node to the IAB node) in one CC, the parent node of the IAB node configures the BWP set i' corresponds to the BWPi. This BWP set i' is used for potential access link transmission, that is, potential transmission for the IAB node to its child nodes. The number of BWPs contained in a BWP set can be only 1.

For example, there are 4 BWPs under a CC, and potential data transmissions from the parent node of the IAB to the IAB node, that is, BWP 0, 1, 2, 3, and correspond to 4 BWP sets BWP set 0', set 1', set 2' and set 3', respectively. A BWP set i' may contain one or more BWP configurations for potential transmission from the IAB node to its child nodes. If BWP i is used for IAB parent to IAB node data transmission, then IAB node's parent node wants the IAB node's data transfer to its child nodes to be transferred using one BWP of BWP set i'. If the BWP set i' contains multiple BWPs, the actual data signal used to transmit the IAB node to the child nodes depends on the choice of the IAB node. That is, the IAB node selects a data transfer from the IAB node to the child node from the BWP in the BWP set i' corresponding to the BWPi.

In some embodiments, when the parent node of the IAB configures the BWP, it can configure according to the corresponding relationship, and configures the BWP in the first BWP set having the corresponding relationship and the BWP in the second BWP set to be jointly configured. For example, configure multiple BWP sets. The first one in each set is used for the backhaul link, and the other BWP corresponds to the first BWP. It is used to access the link. Optionally, the parent node of the IAB is configured according to the BWP set when configuring the BWP. For example, the first set and the second set are separately configured. Of course, the downlink and the uplink in the first set are separately configured.

4. Exemplary Embodiments for Determining SFI (Slot Format Indicator) Timing

Figure 12:
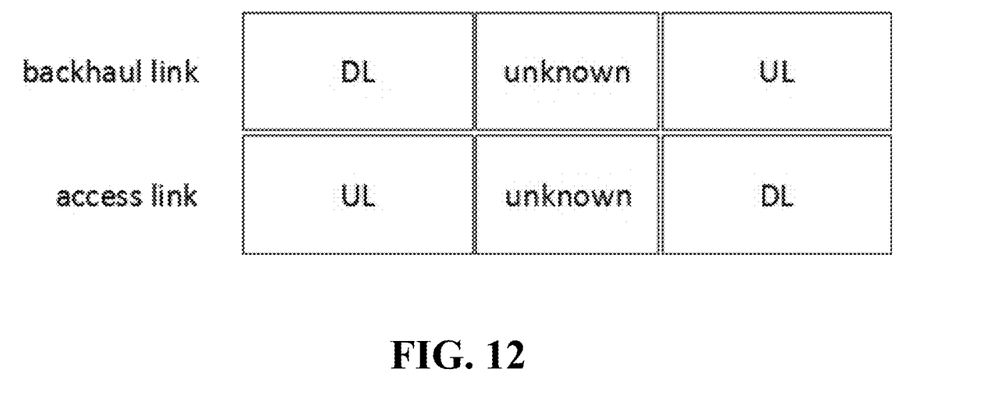
FIG. 12 shows an example of uplink and downlink subframe structure configuration.

As discussed above, in order to simultaneously receive data of BD and AU, or send data of BU and AD at the same time, the time slot structure of the backhaul link and the access link is preferably reversed, as shown in FIG. 12, and the slot boundaries are best aligned.

In general, an IAB node receives a semi-static slot structure or a dynamic slot configuration sent by its parent node. The IAB node can reconfigure the time slot structure configuration to the child node accordingly, to achieve the effect of FIG. 12.

The notification of the current NR dynamic SFI is indicated by the DCI format 2_0 and is effective in the current time slot sent by the corresponding PDCCH. This brings difficulties to the structure shown in FIG. 12. For example, at the slot n moment, the IAB node receives the SFI PDCCH sent by its parent node, and the backhaul link applies the configured SFI in the slot n. However, in order for the IAB node to make corresponding adjustments to achieve the effect of FIG. 12, it is difficult to immediately send the corresponding SFI to its child nodes in the current slot n, because it takes time to demodulate the PDCCH of the parent node. In this way, there will be a period of ambiguity that will not achieve the effect of FIG. 12.

In order to enable the SFI sent by the parent node of the IAB node and the corresponding SFI sent by the IAB node to the child node to take effect at the same time, a time domain time offset may be introduced between the time of sending the PDCCH of the SFI and the SFI effective time. For multi-hop transfers, the time offset can be determined by the hop order of the link. Or, the larger the time offset value configured on the hop order smaller link is.

For example, and in the context of FIG. 3, the link order of Hop order 0 (from base station to IAB node 1) is set to allow all link SFIs to take effect simultaneously and achieve the effect of FIG. 12. The domain offset time is maximum, that is, DCI format 2_0 is transmitted on slot n as shown in FIG. 13.

Figure 13:
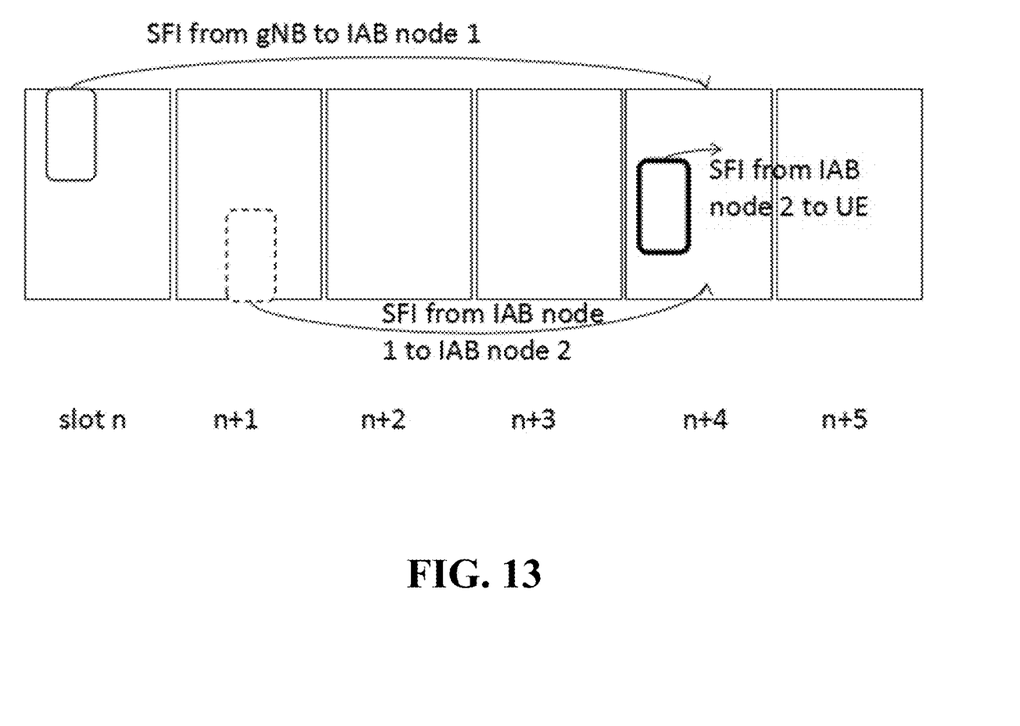
FIG. 13 shows an example of the slot format indicator (SFI) effective time deviation being related to a hop order in a multi-IAB node network.

As shown in FIG. 13, the SFI effective time is in slot n+4. The time domain offset of the link configuration of Hop order 1 (from IAB node 1 to IAB node 2) is smaller, that is, DCI format 2_0 is sent on slot n+1, and the SFI effective time is also in slot n+4. In this way, the IAB node 1 may respond after receiving the SFI signaling sent by the base station, then change the SFI signaling and send the corresponding DCI on the slot n+1 to the IAB node 2. After the IAB node 2 receives the SFI sent by the IAB node 1, it can send the new SFI to the UE in the slot n+4, and takes effect in the time slot n+4 (in order to be compatible with the previous UE, the last link does not introduce the slot offset).

In some embodiments, and in order to ensure that the SFIs of all the links are in effect at the same time, the time offset can be associated with the total number of hop times of all links. For example, as shown in FIG. 13, the time offset of the link for hop order 0 is related to the total number of hops from the base station to the UE. The threshold of the hop order 1 link is the associated with the total number of hops from the IAB node 1 to the UE. That is, the time domain offset of an IAB node configured for its child node may be related to the total number of Hops of all the links between the IAB node and the UE. The smaller of the hop order, the bigger value of the time offset between the time of sending the DCI carried SFI and the SFI effective time should be configured.

5. Exemplary Methods Based on the Disclosed Technology

The examples and exemplary embodiments described above may be incorporated in the context of the methods described below, e.g., methods 1400, 1500 and 1600.

Figure 14:
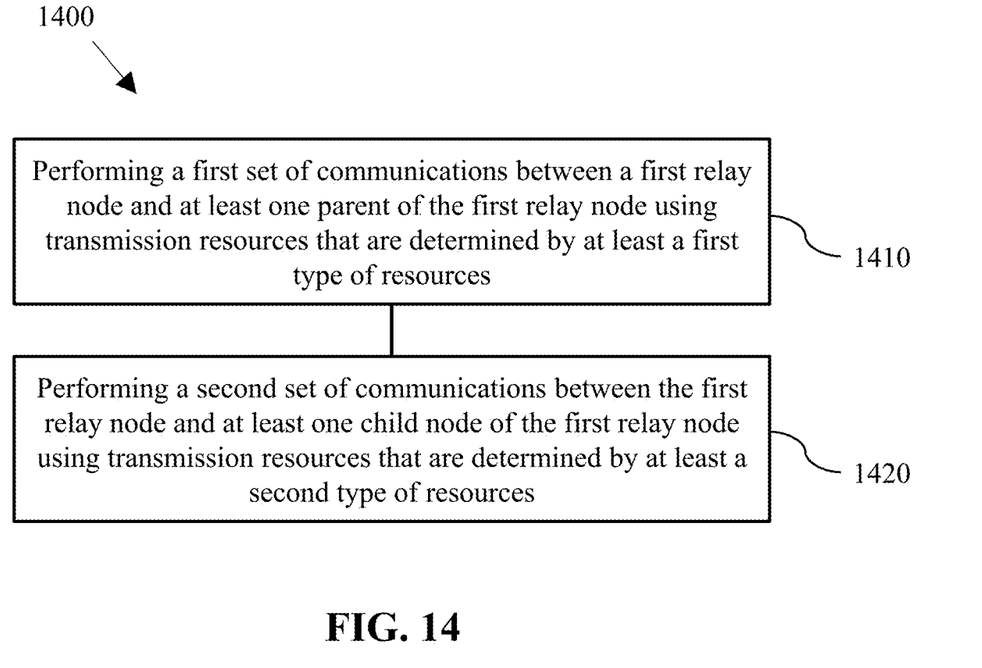
FIG. 14 shows an example of a wireless communication method for resource reservations for IAB nodes.

FIG. 14 shows an example of a wireless communication method 1400 for resource reservations for IAB nodes. The method 1400 includes, at step 1410, performing a first set of communications between a first relay node and at least one parent of the first relay node using transmission resources that are determined by at least a first type of resources.

The method 1400 includes, at step 1420, performing a second set of communications between the first relay node and at least one child node of the first relay node using transmission resources that are determined by at least a second type of resources.

In some embodiments, the child node is a user equipment or a second relay node. For example, the first and second relay nodes Integrated Access and Backhaul (IAB) nodes.

Figure 15:
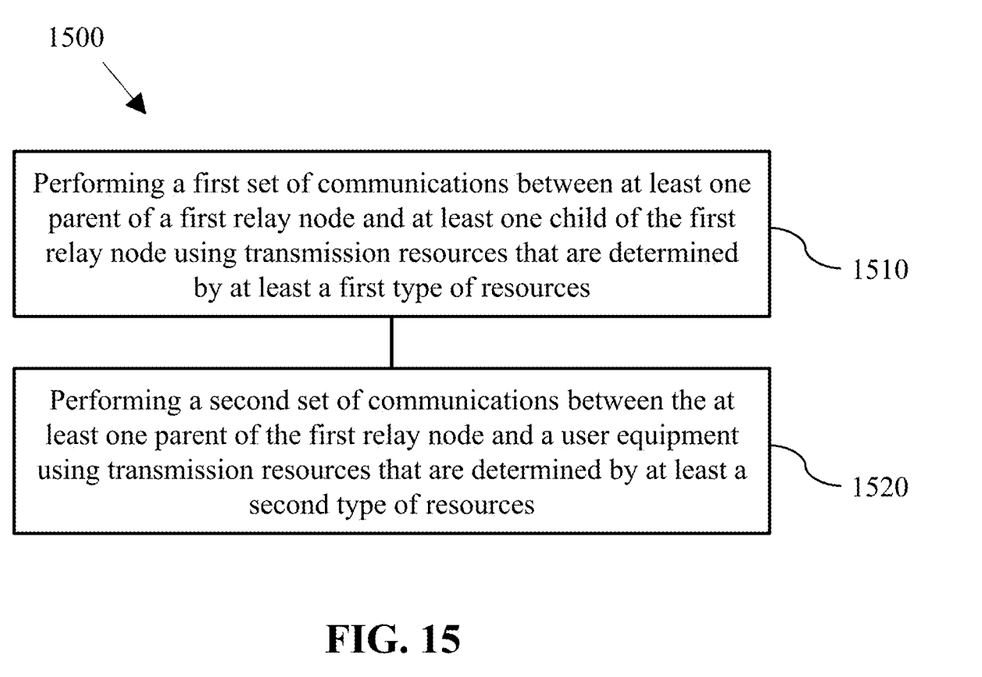
FIG. 15 shows another example of a wireless communication method for resource reservations for IAB nodes.

FIG. 15 shows another example of a wireless communication method 1500 for resource reservations for IAB nodes. This example includes some features and/or components that are similar to those shown in FIG. 14, and described above. At least some of these features and/or components may not be separately described in this section.

The method 1500 includes, at step 1510, performing a first set of communications between at least one parent of a first relay node and at least one child of the first relay node using transmission resources that are determined by at least a first type of resources.

The method 1500 includes, at step 1520, performing a second set of communications between the at least one parent of the first relay node and a user equipment using transmission resources that are determined by at least a second type of resources.

In some embodiments, and in the context of methods 1400 and 1500, the first and the second types of resources may be configured by a parent of the first relay node.

In some embodiments, and as described above in Examples 1-1c, the first type of resources is not used for the first set of communications, and the second type of resources is not used for the second set of communications.

In some embodiments, and as described above in Examples 2 and 2a, a third set of communications between the first relay node and a user equipment are performed using transmission resources that exclude a third type of reserved resources.

In some embodiments, the first type of resources include a first set of frequency domain resources and may be used for the first set of communications, and the second type of resources include a second set of frequency domain resources and may be used for the second set of communications. In other embodiments, the first set of frequency domain resources may include a first set of bandwidth parts (BWPs), and the second set of frequency domain resources may include a second set of BWPs.

In some embodiments, correspondences between each of the first set of frequency domain resources and each of the second set of frequency domain resources are used to coordinate the first and second sets of communications. In an example, each of the first set of BWPs corresponds to one or more of the second set of BWPs, and corresponding BWPs are used for the first and second sets of communications at the same time. In another example, the correspondences may be configured by the at least one parent of the first relay node.

In some embodiments, the first or second type of resources may be divided into a first type of sub-resource for downlink communications and a second type of sub-resource for uplink communications. For example, and as described in the context of FIG. 3, the backhaul and access links may be partitioned into uplink and downlink portions.

Figure 16:
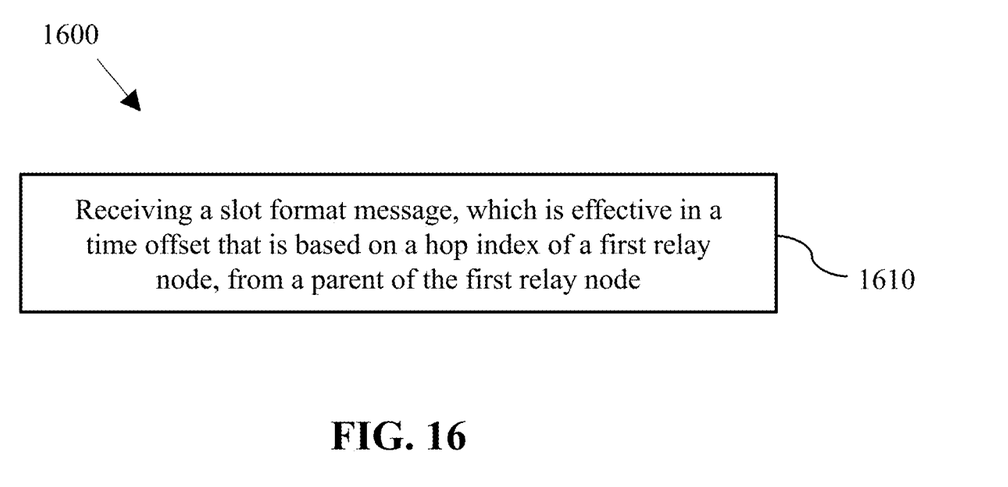
FIG. 16 shows yet another example of a wireless communication method for resource reservations for IAB nodes.

FIG. 16 shows yet another example of a wireless communication method 1600 for resource reservations for IAB nodes. The method 1600 includes, at step 1610, receiving a slot format message from a parent of the first relay node, where the slot format message is effective in a time offset, and where the time offset is based on a hop index of the first relay node.

In some embodiments, the time offset may decrease as a hop index increases.

In some embodiments, the hop index of a relay node is determined or configured by at least one parent of the relay node itself.

6. Example Implementations of the Disclosed Technology

Figure 17:
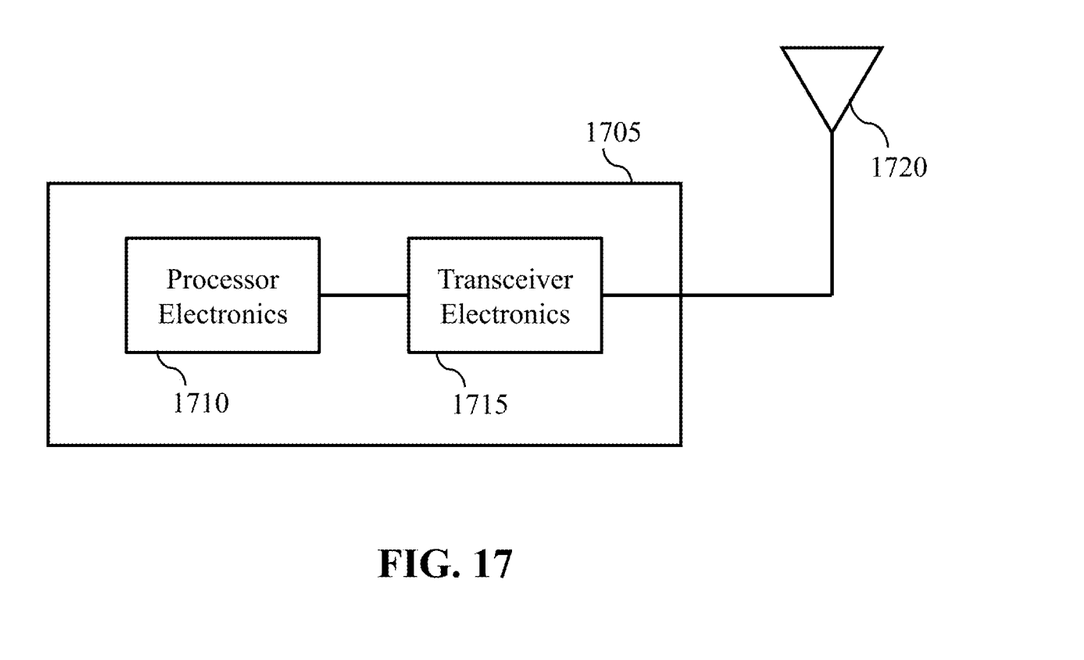
FIG. 17 is a block diagram representation of a portion of an apparatus, in accordance with some embodiments of the presently disclosed technology.

FIG. 17 is a block diagram representation of a portion of an apparatus, in accordance with some embodiments of the presently disclosed technology. An apparatus 1705, such as a base station or a wireless device (or UE), can include processor electronics 1710 such as a microprocessor that implements one or more of the techniques presented in this document including, but not limited to, methods 1400, 1500 and 1600. The apparatus 1705 can include transceiver electronics 1715 to send and/or receive wireless signals over one or more communication interfaces such as antenna(s) 1720. The apparatus 1705 can include other communication interfaces for transmitting and receiving data. Apparatus 1705 can include one or more memories (not explicitly shown) configured to store information such as data and/or instructions. In some implementations, the processor electronics 1710 can include at least a portion of the transceiver electronics 1715. In some embodiments, at least some of the disclosed techniques, modules or functions are implemented using the apparatus 1705.

It is intended that the specification, together with the drawings, be considered exemplary only, where exemplary means an example and, unless otherwise stated, does not imply an ideal or a preferred embodiment. As used herein, the singular forms "a", "an" and "the" are intended to include the plural forms as well, unless the context clearly indicates otherwise. Additionally, the use of "or" is intended to include "and/or", unless the context clearly indicates otherwise.

Some of the embodiments described herein are described in the general context of methods or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Therefore, the computer-readable media can include a non-transitory storage media. Generally, program modules may include routines, programs, objects, components, data structures, etc. that perform particular tasks or implement particular abstract data types. Computer- or processor-executable instructions, associated data structures, and program modules represent examples of program code for executing steps of the methods disclosed herein. The particular sequence of such executable instructions or associated data structures represents examples of corresponding acts for implementing the functions described in such steps or processes.

Some of the disclosed embodiments can be implemented as devices or modules using hardware circuits, software, or combinations thereof. For example, a hardware circuit implementation can include discrete analog and/or digital components that are, for example, integrated as part of a printed circuit board. Alternatively, or additionally, the disclosed components or modules can be implemented as an Application Specific Integrated Circuit (ASIC) and/or as a Field Programmable Gate Array (FPGA) device. Some implementations may additionally or alternatively include a digital signal processor (DSP) that is a specialized microprocessor with an architecture optimized for the operational needs of digital signal processing associated with the disclosed functionalities of this application. Similarly, the various components or sub-components within each module may be implemented in software, hardware or firmware. The connectivity between the modules and/or components within the modules may be provided using any one of the connectivity methods and media that is known in the art, including, but not limited to, communications over the Internet, wired, or wireless networks using the appropriate protocols.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few implementations and examples are described and other implementations, enhancements and variations can be made based on what is described and illustrated in this disclosure.

What is claimed is:

1. A method for wireless communication, comprising:
    performing a first set of communications between a first relay node and at least one parent of the first relay node using reserved transmission resources that exclude a first type of resources, wherein the first type of resources include reserved resources that are not used for the first set of communications; and
    performing a second set of communications between the first relay node and at least one child node of the first relay node using reserved transmission resources that exclude a second type of resources, wherein the second type of resources include reserved resources that are not used for the second set of communications.

2. The method of claim 1, wherein the at least one child node is a user equipment or an Integrated Access and Backhaul (IAB) node.

3. The method of claim 1, wherein the first and the second types of resources are configured by the at least one parent of the first relay node.

4. The method of claim 1, wherein the first type of resources comprise a first set of frequency domain resources, and wherein the second type of resources comprise a second set of frequency domain resources.

5. The method of claim 4, wherein the first set of frequency domain resources comprises a first set of bandwidth parts (BWPs), and wherein the second set of frequency domain resources comprises a second set of BWPs.

6. The method of claim 5, wherein each of the first set of BWPs corresponds to one or more of the second set of BWPs.

7. The method of claim 4, wherein correspondences between each of the first set of frequency domain resources and each of the second set of frequency domain resources are used to coordinate the first and second sets of communications.

8. An apparatus for wireless communication, comprising:
    a processor; and
    a transceiver, coupled to the processor, configured to:
        perform a first set of communications between at least one parent of a first relay node and at least one child of the first relay node using reserved transmission resources that exclude a first type of resources, wherein the first type of resources include reserved resources that are not used for the first set of communications; and
        perform a second set of communications between the at least one parent of the first relay node and a user equipment using reserved transmission resources that exclude a second type of resources, wherein the second type of resources include reserved resources that are not used for the second set of communications.

9. The apparatus of claim 8, wherein the first and the second types of resources are configured by the at least one parent of the first relay node.

10. The apparatus of claim 8, wherein a third set of communications between the first relay node and the user equipment are performed using transmission resources that exclude the second type of resources.

11. The apparatus of claim 8, wherein a third set of communications between the first relay node and the user equipment are performed using transmission resources that exclude a third type of resources.

12. The apparatus of claim 8, wherein the first type of resources comprise a first set of frequency domain resources, and wherein the second type of resources comprise a second set of frequency domain resources.

13. The apparatus of claim 12, wherein the first type of resources is used for the first set of communications, and wherein the second type of resources is used for the second set of communications.

14. The apparatus of claim 12, wherein the first set of frequency domain resources comprises a first set of bandwidth parts (BWPs), and wherein the second set of frequency domain resources comprises a second set of BWPs.

15. The apparatus of claim 14, wherein correspondences between each of the first set of frequency domain resources and each of the second set of frequency domain resources are used to coordinate the first and second sets of communications.

16. The apparatus of claim 15, wherein each of the first set of BWPs corresponds to one or more of the second set of BWPs.

17. The apparatus of claim 16, wherein corresponding BWPs are used for the first and second sets of communications at the same time.

18. The apparatus of claim 15, wherein the correspondences are configured by the at least one parent of the first relay node.

19. The apparatus of claim 8, wherein the first or second type of resources is divided into a first type of sub-resource for downlink communications and a second type of sub-resource for uplink communications.

20. The apparatus of claim 8, wherein the first relay node is an Integrated Access and Backhaul (IAB) node.

21. A non-transitory computer readable program storage medium having code stored thereon, the code, when executed by a processor, causing the processor to implement a method, comprising:
performing a first set of communications between a first relay node and at least one parent of the first relay node using reserved transmission resources that exclude a first type of resources, wherein the first type of resources include reserved resources that are not used for the first set of communications; and
performing a second set of communications between the first relay node and at least one child node of the first relay node using reserved transmission resources that exclude a second type of resources, wherein the second type of resources include reserved resources that are not used for the second set of communications.

\* \* \* \* \*